(12) United States Patent
Takahashi et al.

(10) Patent No.: US 12,464,514 B2
(45) Date of Patent: Nov. 4, 2025

(54) TERMINAL AND COMMUNICATION METHOD

(71) Applicant: NTT DOCOMO, INC., Tokyo (JP)

(72) Inventors: Hideaki Takahashi, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 406 days.

(21) Appl. No.: 18/001,663

(22) PCT Filed: Jul. 8, 2021

(86) PCT No.: PCT/JP2021/025817
§ 371 (c)(1),
(2) Date: Dec. 13, 2022

(87) PCT Pub. No.: WO2022/038919
PCT Pub. Date: Feb. 24, 2022

(65) Prior Publication Data
US 2023/0239856 A1 Jul. 27, 2023

(30) Foreign Application Priority Data
Aug. 17, 2020 (JP) .................. 2020-137665

(51) Int. Cl.
*H04W 72/12* (2023.01)
*H04W 48/10* (2009.01)

(52) U.S. Cl.
CPC ............ *H04W 72/12* (2013.01); *H04W 48/10* (2013.01)

(58) Field of Classification Search
CPC ..... H04W 72/00; H04W 72/12; H04W 72/23; H04W 48/10; H04W 48/12; H04L 5/00; H04L 5/0091
See application file for complete search history.

(56) References Cited

U.S. PATENT DOCUMENTS

| | | | |
|---|---|---|---|
| 12,200,586 B2 * | 1/2025 | Martin | H04W 4/70 |
| 2015/0181575 A1 * | 6/2015 | Ng | H04L 5/0092 |
| | | | 370/329 |
| 2023/0254736 A1 * | 8/2023 | Choi | H04W 28/06 |
| | | | 370/329 |
| 2025/0056386 A1 * | 2/2025 | Gunnarsson | H04W 64/003 |

OTHER PUBLICATIONS

International Search Report issued in PCT/JP2021/025817 on Sep. 14, 2021 (3 pages).
Written Opinion of the International Searching Authority issued in PCT/JP2021/025817 on Sep. 14, 2021 (4 pages).
(Continued)

*Primary Examiner* — Mohamed A Kamara
(74) *Attorney, Agent, or Firm* — Osha Bergman Watanabe & Burton LLP

(57) ABSTRACT

A terminal includes a receiver configured to receive first system information from a base station; and a controller configured to acquire, from the first system information, a first list, a second list, and a third list for scheduling second system information other than the first system information, and to determine a start position of a window for acquiring the second system information, based on the first list, the second list, and the third list, wherein the receiver receives the second system information from the base station in the window.

4 Claims, 11 Drawing Sheets

(56) References Cited

OTHER PUBLICATIONS

3GPP TS 38.331 V16.1.0; "3rd Generation Partnership Project; Technical Specification Group Radio Access Network; NR; Radio Resource Control (RRC) protocol specification (Release 16)"; Jul. 2020 (5 pages).
NTT Docomo, Inc.; "Problem on SI scheduling via an extended field"; 3GPP TSG-RAN WG2 #111 electronic, R2-2008083; Aug. 17-28, 2020 (7 pages).
3GPP TS 36.331 V15.10.0; "3rd Generation Partnership Project; Technical Specification Group Radio Access Network; Evolved Universal Terrestrial Radio Access (E-UTRA); Radio Resource Control (RRC); Protocol specification (Release 15)"; Jul. 2020 (965 pages).
Office Action issued in Japanese Application No. 2022-543315; Dated Nov. 21, 2023 (6 pages).
Extended European Search Report regarding European Application No. 21858068.6, dated Jul. 18, 2024 (12 pages).
Office Action issued in counterpart Chinese Patent Application No. 202180060843.9 mailed on Jun. 27, 2025 (18 pages).
3GPP TS 36.331 V16.1.1; "3rd Generation Partnership Project; Technical Specification Group Radio Access Network; Evolved Universal Terrestrial Radio Access (E-UTRA); Radio Resource Control (RRC); Protocol specification (Release 16)"; Jul. 2020 (1073 pages).

\* cited by examiner

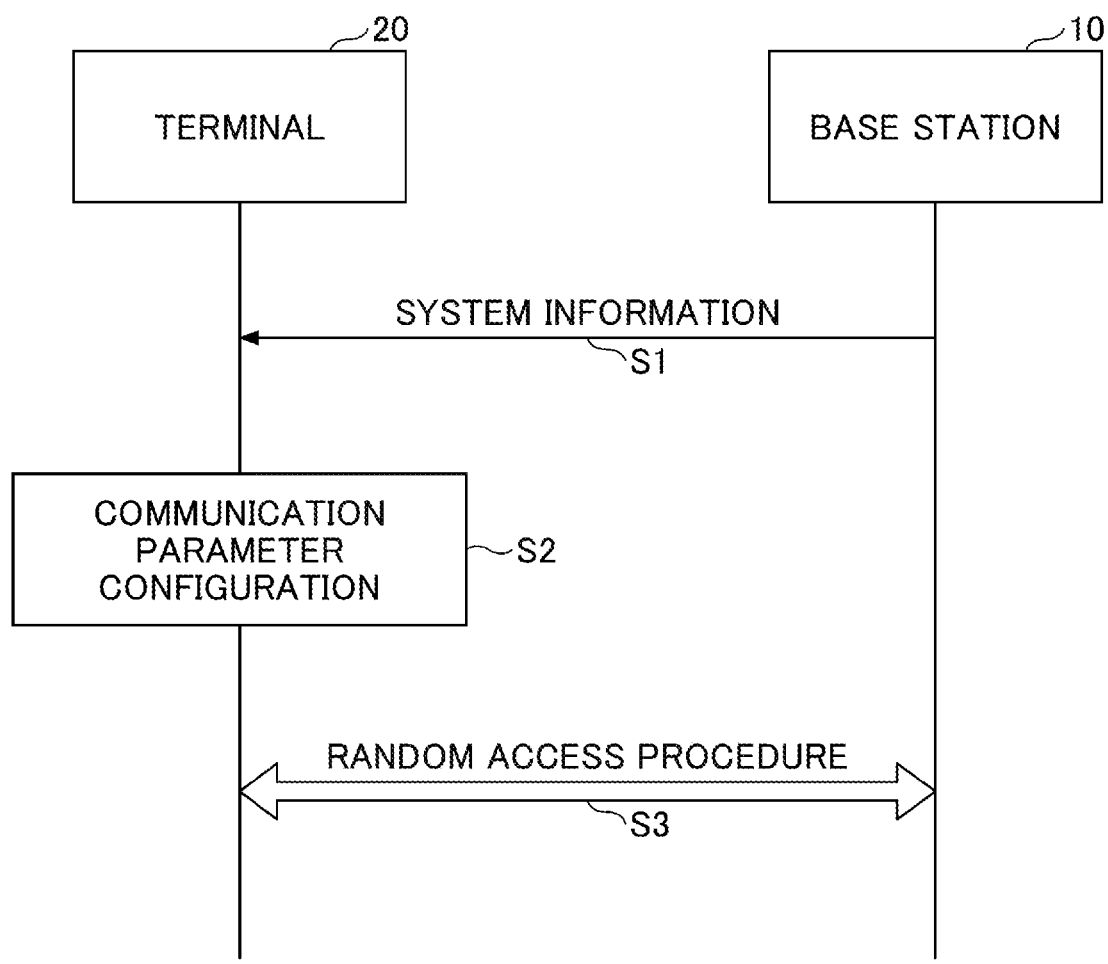

FIG.4

SystemInformationBlockType1 message

```
-- ASN1START
[...]
SystemInformationBlockType1-v1540-IEs ::=   SEQUENCE {
    si-posOffset-r15                    ENUMERATED {true}        OPTIONAL,  -- Need ON
    nonCriticalExtension            SystemInformationBlockType1-v15xy-IEs           OPTIONAL
}
SystemInformationBlockType1-v15xy-IEs ::=   SEQUENCE {
    schedulingInfoList-v15xy        SchedulingInfoList-v15xy OPTIONAL,  -- Need OR
    nonCriticalExtension                SEQUENCE {}                OPTIONAL
}

SchedulingInfoList-v15xy ::= SEQUENCE (SIZE (1..maxSI-Message)) OF SchedulingInfo-v15xy SchedulingInfo-v15xy ::= SEQUENCE {
    si-Periodicity-r15      ENUMERATED {rf8, rf16, rf32, rf64, rf128, rf256, rf512},
    sib-MappingInfo-v15xy   SIB-MappingInfo-v15xy
}

SIB-MappingInfo-v15xy ::= SEQUENCE (SIZE (0..maxSIB-1)) OF SIB-Type-v15xy

SIB-Type-v15xy ::=
    ENUMERATED {
        sibType19-v1250, sibType20-v1310, sibType21-v1430,
        sibType24-v1530, sibType25-v1530, sibType26-v1530,
        spare2, spare1, ...}

[...]
-- ASN1STOP
```

FIG.5

| SystemInformationBlockType1 field descriptions |
|---|
| schedulingInfoList<br>Indicates scheduling information of SI messages from SIB3 to SIB18. E-UTRAN shall not schedule SIB19 and onwards via this field. |
| schedulingInfoList-v15xy<br>Indicates scheduling information of SI messages from SIB19 and onwards. This field shall not schedule the same SIBs as in *schedulingInfoList* (without suffix). |

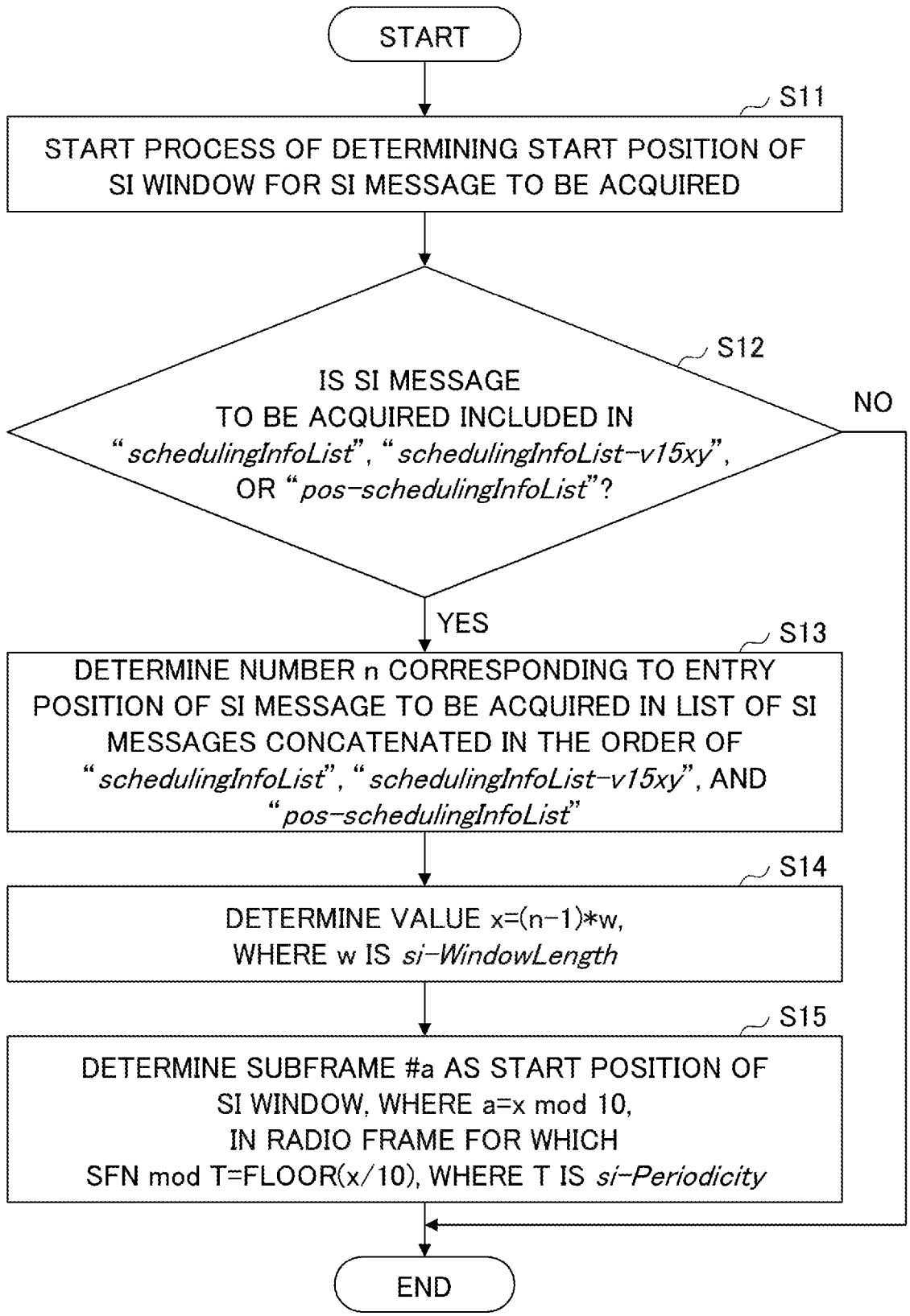

FIG.7

When acquiring an SI message, the UE shall:

1> determine the start of the SI-window for the concerned SI message as follows:

2> if the concerned SI message is configured in the *schedulingInfoList*, *schedulingInfoList-v15xy* or if the concerned SI message is configured in the *pos-schedulingInfoList* and *si-posOffset* is not configured;

3> for the concerned SI message, determine the number $n$ which corresponds to the order of entry in the concatenated list of SI messages configured by *schedulingInfoList*, *schedulingInfoList-v15xy* and *posSchedulingInfoList* in *SystemInformationBlockType1*;

3> determine the integer value $x = (n - 1)*w$, where $w$ is the *si-WindowLength*;

3> the SI-window starts at the subframe #$a$, where $a = x$ mod 10, in the radio frame for which SFN mod $T$ = FLOOR($x$/10), where $T$ is the *si-Periodicity* of the concerned SI message;

[...]

1> receive DL-SCH using the SI-RNTI from the start of the SI-window and continue until the end of the SI-window whose absolute length in time is given by *si-WindowLength*, or until the SI message was received, excluding the following subframes:

2> subframe #5 in radio frames for which SFN mod 2 = 0;

2> any MBSFN subframes;

2> any uplink subframes in TDD;

1> if the SI message was not received by the end of the SI-window, repeat reception at the next SI-window occasion for the concerned SI message;

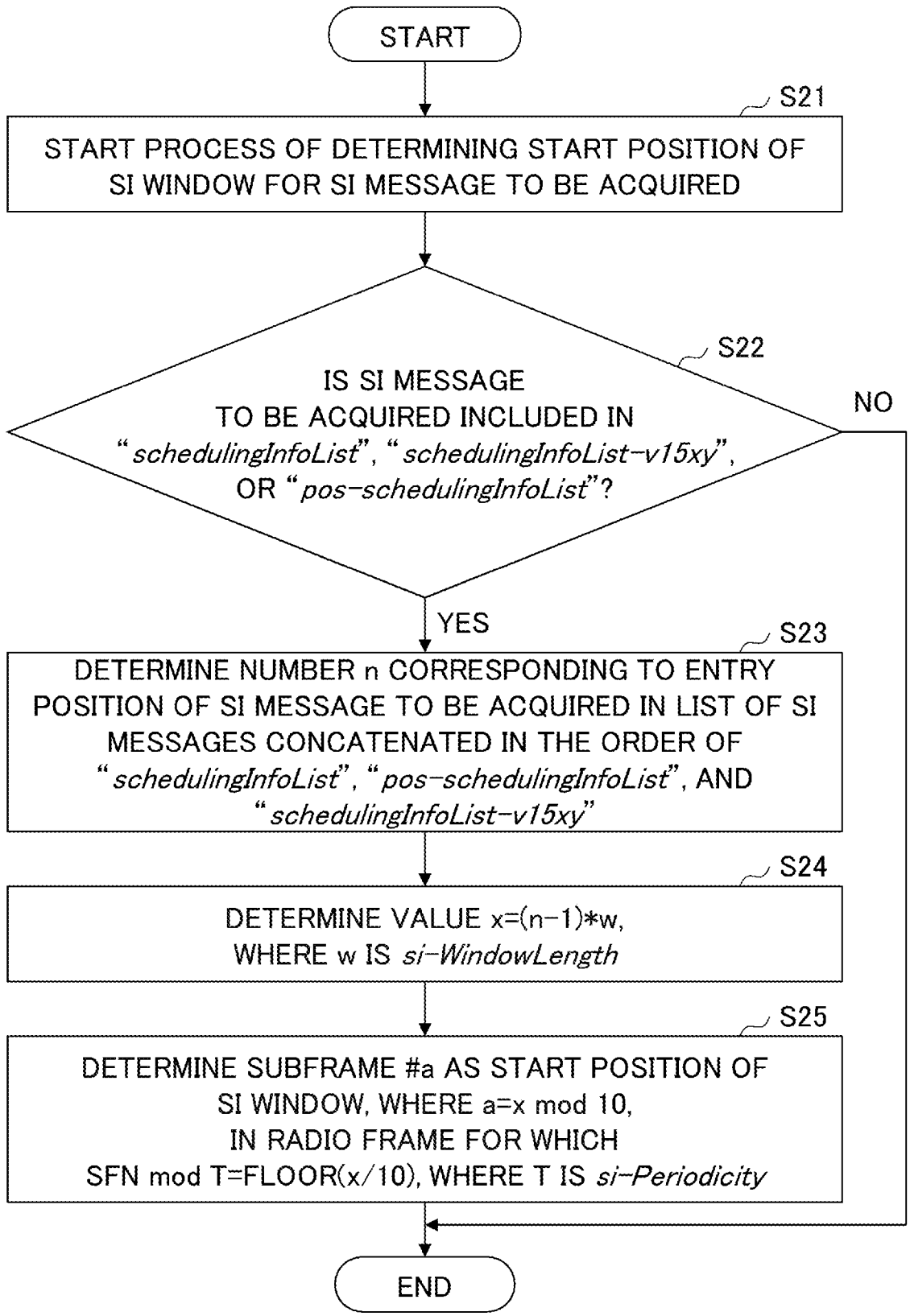

FIG.9

When acquiring an SI message, the UE shall:

1> determine the start of the SI-window for the concerned SI message as follows:

2> if the concerned SI message is configured in the *schedulingInfoList*, *schedulingInfoList-v15xy* or if the concerned SI message is configured in the *pos-schedulingInfoList* and *si-posOffset* is not configured;

3> for the concerned SI message, determine the number $n$ which corresponds to the order of entry in the concatenated list of SI messages configured by *schedulingInfoList*, *posSchedulingInfoList* and *schedulingInfoList-v15xy* in *SystemInformationBlockType1*;

3> determine the integer value $x = (n - 1)*w$, where $w$ is the *si-WindowLength*;

3> the SI-window starts at the subframe #$a$, where $a = x$ mod 10, in the radio frame for which SFN mod $T$ = FLOOR($x$/10), where $T$ is the *si-Periodicity* of the concerned SI message;

[...]

1> receive DL-SCH using the SI-RNTI from the start of the SI-window and continue until the end of the SI-window whose absolute length in time is given by *si-WindowLength*, or until the SI message was received, excluding the following subframes:

2> subframe #5 in radio frames for which SFN mod 2 = 0;

2> any MBSFN subframes;

2> any uplink subframes in TDD;

1> if the SI message was not received by the end of the SI-window, repeat reception at the next SI-window occasion for the concerned SI message;

TERMINAL AND COMMUNICATION METHOD

FIELD OF THE INVENTION

The present invention relates to a terminal and a communication method in a wireless communication system.

BACKGROUND OF THE INVENTION

In the LTE (Long Term Evolution) and NR (New Radio) (also referred to as "5G") that is a successor system of LTE, the terminal acquires system information (SI, System Information) that is broadcast from the base station and the frequency band and bandwidth to be used for downlink or uplink are configured, for example. In a case where connection to a cell is not barred in the system information, the terminal can camp on the cell (for example, Non-Patent Document 1).

CITATION LIST

[Non-Patent Document 1] 3GPP TS 36.331 V15.10.0 (2020-07)

SUMMARY OF THE INVENTION

Technical Problem

Scheduling of system information is performed using SIB1 (System Information Block Type 1). For example, when system information is extended for functional enhancement, it is necessary to specify a scheduling method so that the terminal can obtain system information correctly.

The present invention has been made in view of the foregoing and it is an object to schedule extended system information.

Solution to Problem

According to the disclosed technique, there is provided A terminal that includes
a receiver configured to receive first system information from a base station; and
a controller configured to acquire, from the first system information, a first list, a second list, and a third list for scheduling second system information other than the first system information, and to determine a start position of a window for acquiring the second system information, based on the first list, the second list, and the third list, wherein the receiver receives the second system information from the base station in the window.

Advantageous Effects of Invention

The disclosed techniques enable scheduling of extended system information.

BRIEF DESCRIPTION OF THE DRAWINGS

FIG. 3 is a sequence diagram illustrating an example of system information acquisition according to an embodiment of the present invention.

FIG. 4 is a diagram illustrating an example (1) of a specification modification according to an embodiment of the present invention.

FIG. 5 is a diagram illustrating an example (2) of a specification modification according to an embodiment of the present invention.

FIG. 6 is a flowchart illustrating an example (1) of acquiring system information according to an embodiment of the present invention.

FIG. 7 is a diagram illustrating an example (3) of a specification modification according to an embodiment of the present invention.

FIG. 8 is a flowchart illustrating an example (2) of acquiring system information according to an embodiment of the present invention.

FIG. 9 is a diagram illustrating an example (4) of specification modification according to an embodiment of the present invention.

DETAILED DESCRIPTION OF THE PREFERRED EMBODIMENTS

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, conventional techniques are to be used appropriately. However, the conventional technology is, for example, a conventional LTE, but is not limited to the conventional LTE. The term "LTE" as used herein shall also have a broad meaning, including LTE-Advanced and LTE-Advanced or later forms (e.g., NR), unless otherwise indicated.

In addition, the embodiments of the present invention described below use terms used in the conventional LTE such as SS (Synchronization Signal), PSS (Primary SS), SSS (Secondary SS), PBCH (Physical Broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), and the like. This is for convenience of reference and may be referred to by other names as similar signals, functions, and the like. The above terms in NR correspond to NR-SS, NR-PSS, NR-SSS, NR-PBCH, NR-PRACH, NR-PDCCH, NR-PDSCH, NR-PUCCH, NR-PUSCH, and the like. However, even the signal used for NR is not always specified as "NR-".

In embodiments of the present invention, the duplex method may be a TDD (Time Division Duplex) method, an FDD (Frequency Division Duplex) method, or any other method (e.g., Flexible Duplex, etc.).

Further, in embodiments of the present invention, the wireless parameter or the like is "configured" or "defined" may mean: that a predetermined value is pre-configured; that a value indicated by a base station 10 or a terminal 20 is configured to a wireless parameter or the like; or a value is configured in advance by the specification to a wireless parameter or the like.

Figure 1:
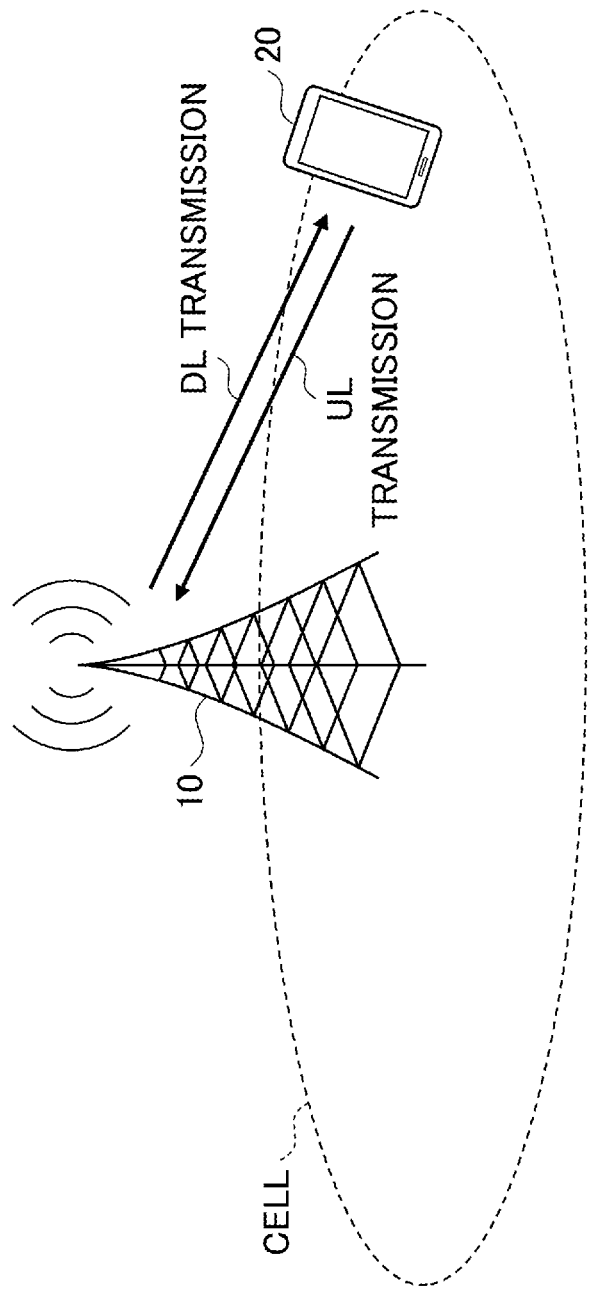
FIG. 1 is a diagram illustrating an example (1) of a configuration of a wireless communication system according to an embodiment of the present invention.

FIG. 1 is a diagram illustrating an example (1) of a configuration of a wireless communication system according to an embodiment of the present invention. As illustrated in FIG. 1, the base station 10 and the terminal 20 are included. In FIG. 1, one base station 10 and one terminal 20 are illustrated, but this is an example and may be more than one each. The terminal 20 may also be referred to as a "user device" or a "UE (user equipment)" or the like.

The base station 10 is a communication device that provides one or more cells and performs wireless communication with the terminal 20. The physical resources of the radio signal are defined in the time domain and the frequency domain, the time domain may be defined in slots or OFDM (Orthogonal Frequency Division Multiplexing) symbols, and the frequency domain may be defined in sub-bands, subcarriers or resource blocks.

As illustrated in FIG. 1, the base station 10 transmits control information or data in DL (Downlink) to the terminal 20 and receives control information or data in UL (Uplink) from the terminal 20. Both the base station 10 and the terminal 20 are capable of beamforming to transmit and receive signals. Both the base station 10 and the terminal 20 may also apply MIMO (Multiple Input Multiple Output) communications to the DL or UL. Both the base station 10 and the terminal 20 may also communicate via a CA (Carrier Aggregation) via a SCell (Secondary Cell) and a PCell (Primary Cell).

The terminal 20 is a communication device with a wireless communication function, such as a smartphone, cellular phone, tablet, wearable terminal, and a communication module for M2M (Machine-to-Machine). As illustrated in FIG. 1, the terminal 20 utilizes various communication services provided by a wireless communication system by receiving control information or data in DL from the base station 10 and transmitting control information or data in UL to the base station 10.

Figure 2:
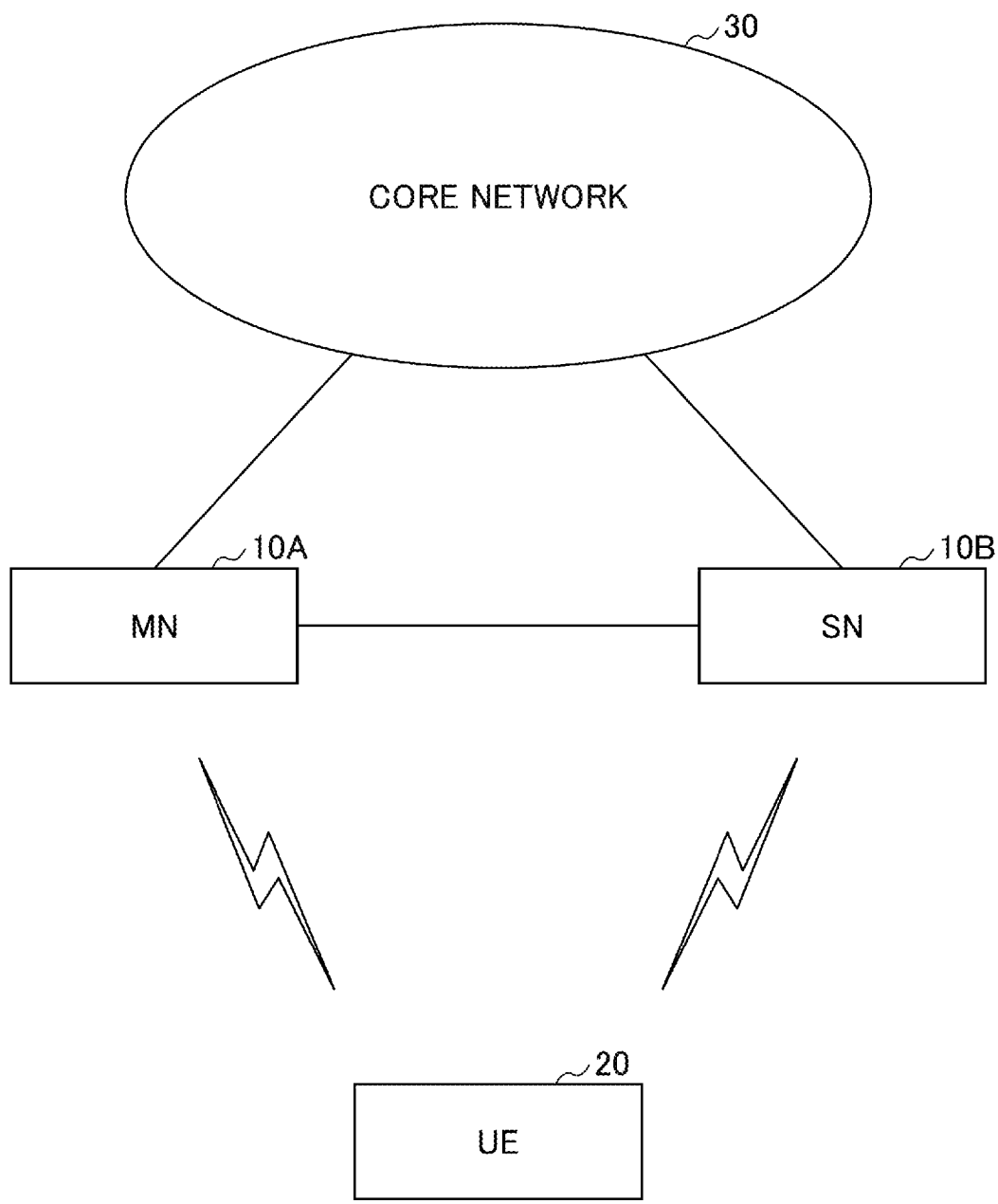
FIG. 2 is a diagram illustrating an example (2) of a configuration of a wireless communication system according to an embodiment of the present invention.

FIG. 2 is a diagram illustrating an example (2) of a configuration of a wireless communication system according to an embodiment of the present invention. FIG. 2 illustrates an example of a configuration of a wireless communication system when NR-DC (NR-Dual connectivity) is executed. As illustrated in FIG. 2, a base station 10A serving as a MN (Master Node) and a base station 10B serving as a SN (Secondary Node) are provided. The base station 10A and the base station 10B are each connected to core network 30. The UE terminal 20 communicates with both the base station 10A and the base station 10B. In addition, a wireless communication system may be configured by EN-DC (E-UTRA NR DC) in which the MN is an LTE base station and the SN is an NR base station.

A cell group provided by the base station 10A that is an MN is called the MCG (Master Cell Group), and the cell group provided by the base station 10B that is an SN is called the SCG (Secondary Cell Group). The operations described below may assume a network configuration operated in the dual connectivity of FIG. 2, or may assume a network configuration operated in standalone mode of FIG. 1.

FIG. 3 is a sequence diagram illustrating an example of system information acquisition according to an embodiment of the present invention. In step S1, the terminal 20 receives system information (SI, system information) from the base station 10 via the cell. For example, system information may include MIB (Master Information Block) and SIB1 (System Information Block Type 1 or System Information Block 1). The MIB is system information transmitted by PBCH. SIB1 may include information on whether the cells are allowed access, scheduling other system information, setting up common wireless resources for UE, prohibition of access, etc.

In step S2, the terminal 20 performs the setting of the communication parameter, based on the acquired system information. For example, frequency bands and bandwidths used for downlinks or uplinks are set. If the cell is not prohibited from connecting in the system information, the terminal 20 may camp on the cell.

If desired, the terminal 20 and the base station 10 may perform random access procedures as illustrated in step S3. For example, the terminal 20 may apply the communication parameters set, based on the system information in step S2 to transmit the uplink. Upon completion of the random access procedure, the terminal 20 and the base station 10 may perform normal communication.

FIG. 4 is a diagram illustrating an example (1) of a specification modification according to an embodiment of the present invention. As illustrated in FIG. 4, new system information "SystemInformationBlockType1-v15xy-IEs" may be defined as part of SIB1. Configured SI is scheduled by SchedulingInfoList-v15xy.

As illustrated in FIG. 4, "si-Periodicity-r15" allows one of the following to be configured as a period of system information: rf8 for 8 radio frames; rf16 for 16 radio frames; rf32 for 32 radio frames; rf64 for 64 radio frames; rf128 for 128 radio frames; rf256 for 256 radio frames; and rf512 for 512 radio frames, each of the radio frames having a duration of 10 ms.

As illustrated in FIG. 4, the "SIB-Type-v15xy" representing the scheduled SIB can configure SIB 19, SIB 20, SIB 21, SIB 24, SIB 25, SIB 26, and the like as system information.

FIG. 5 is a diagram illustrating an example (2) of a specification modification according to an embodiment of the present invention. As illustrated in FIG. 5, the "schedulingInfoList" may schedule system information from SIB3 to SIB18. SchedulingInfoList-v15xy may schedule system information from SIB19 and onwards. Also, as illustrated in FIG. 5, "schedulingInfoList-v15xy" may be defined not to schedule the same SIBs as "schedulingInfoList".

FIG. 6 is a flowchart illustrating an example (1) of acquiring system information according to an embodiment of the present invention. In step S11, the terminal 20 starts the process of determining the start position of the SI window for receiving the SI message to be acquired. Subsequent to step S12, the terminal 20 determines whether the SI message to be acquired is included in "schedulingInfoList", "schedulingInfoList-v15xy", or "pos-schedulingInfoList". If the SI message to be acquired is included in one of the above-mentioned information elements (YES of S12), the process proceeds to step S13, and if the SI message to be acquired is not included in any of the above-mentioned information elements (NO of S12), the flow ends.

In Step S12, "si-posOffset" being not configured may be added to the condition. If "si-posOffset" is enabled, system information is scheduled by "pos-schedulingInfoList" with an offset of 8 radio frames from the system information scheduled by "schedulingInfoList". "pos-schedulingInfo- List" is system information related to position information, and includes, for example, assistance data for GNSS (Global Navigation Satellite System).

In step S13, the terminal 20 determines the number n corresponding to the entry position of the SI message to be acquired in the list of SI messages in which "schedulingInfoList", "schedulingInfoList-v15xy", and "pos-schedulingInfoList" are concatenated in this order.

In step S14, the terminal 20 determines the value x as (n−1)*w, where w is si-WindowLength indicating the length of the SI window. For example, 1 ms, 2 ms, 5 ms, 10 ms, 15 ms, 20 ms, or 40 ms may be configured to si-WindowLength.

In step S15, the terminal 20 determines subframe #a as the start position of the SI window, where a=x mod 10 within the radio frame for which SFN mod T=FLOOR(x/10), where T is si-Periodicity indicating the period of the SI. For example, the si-Periodicity allows one of the following to be configured as a period of system information: rf8 for 8 radio frames; rf16 for 16 radio frames; rf32 for 32 radio frames; rf64 for 64 radio frames; rf128 for 128 radio frames; rf256 for 256 radio frames; and rf512 for 512 radio frames, each of the radio frames having a duration of 10 ms.

FIG. 7 is a diagram illustrating an example (3) of a specification modification according to an embodiment of the present invention. FIG. 7 is an example of a specification change corresponding to the flowchart of FIG. 6. As illustrated in FIG. 7, the terminal 20 may determine the number n corresponding to the entry position of the SI message to be acquired in the list of SI messages in which "schedulingInfoList", "schedulingInfoList-v15xy" and "pos-schedulingInfoList" are concatenated in this order.

FIG. 8 is a flowchart illustrating an example (2) of system information acquisition according to an embodiment of the present invention. In step S21, the terminal 20 starts the process of determining the start position of the SI window for receiving the SI message to be acquired. Subsequent to step S22, the terminal 20 determines whether the SI message to be acquired is included in "schedulingInfoList", "schedulingInfoList-v15xy", or "pos-schedulingInfoList". When the SI message to be acquired is included in one of the above-mentioned information elements (YES of S22), the process proceeds to step S23, and when the SI message to be acquired is not included in any of the above-mentioned information elements (NO of S22), the flow ends.

In Step S22, "si-posOffset" being not configured may be added to the condition. If "si-posOffset" is enabled, system information is scheduled by "pos-schedulingInfoList" with an offset of 8 radio frames from the system information scheduled by "schedulingInfoList".

In step S23, the terminal 20 determines the number n corresponding to the entry position of the SI message to be acquired in the list of SI messages in which "schedulingInfoList", "pos-schedulingInfoList", and "schedulingInfoList-v15xy" are concatenated in this order.

In subsequent step S14, the terminal 20 determines a value x as (n−1)×w, where w is si-WindowLength representing the length of the SI window.

In subsequent step S25, the terminal 20 sets subframe #a as the start position of the SI window, where a=x mod 10 within the radio frame for which SFN mod T=FLOOR(x/10), where T is si-Periodicity indicating the periodicity of the SI.

FIG. 9 is a diagram illustrating an example (4) of a specification modification according to an embodiment of the present invention. FIG. 9 is an example of a specification modification corresponding to the flowchart of FIG. 8. As illustrated in FIG. 9, the terminal 20 may determine the number n corresponding to the entry position of the SI message to be acquired in the list of SI messages in which "schedulingInfoList", "pos-schedulingInfoList", and "schedulingInfoList-v15xy" are concatenated in this order.

According to the embodiment described above, the terminal 20 can reliably obtain the scheduled system information when the system information is extended.

That is, extended system information can be scheduled.

(Function Configuration)

Next, a functional configuration example of the base station 10 and the terminal 20 for performing the processes and operations described above will be described. The base station 10 and the terminal 20 include functions for implementing the embodiments described above. However, each of the base stations 10 and the terminal 20 may include only some of the functions in the embodiment.

<Base Station 10>

Figure 10:
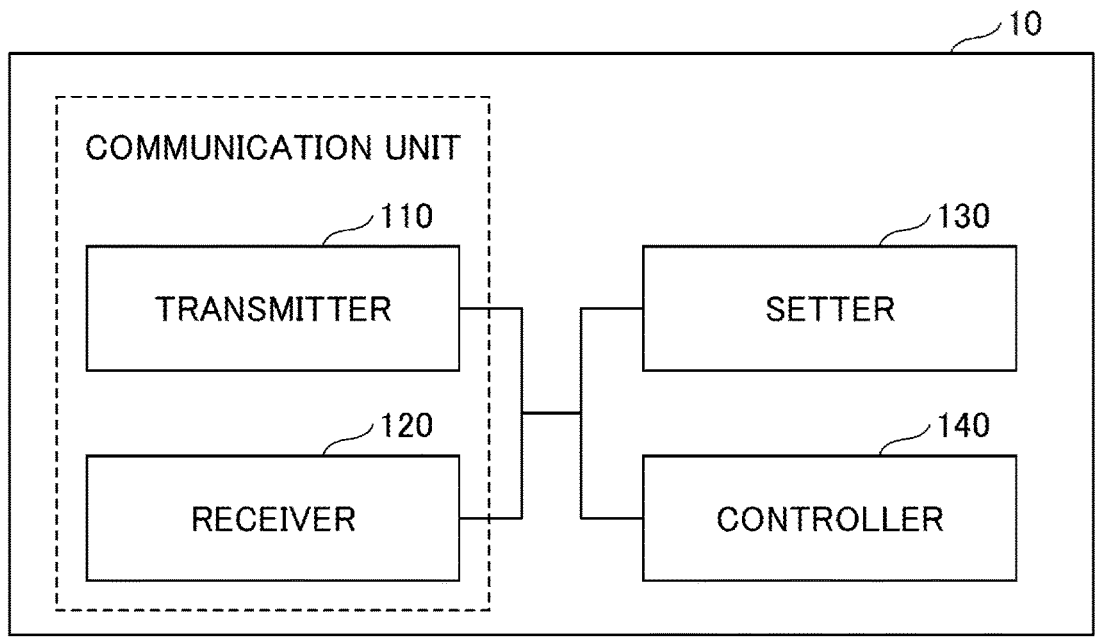
FIG. 10 is a diagram illustrating an example of a functional configuration of the base station 10 according to an embodiment of the present invention.

FIG. 10 is a diagram illustrating an example of the functional configuration of the base station 10 according to an embodiment of the present invention. As illustrated in FIG. 10, the base station 10 includes a transmitter 110, a receiver 120, a setter 130, and a controller 140. The functional configuration illustrated in FIG. 10 is only one example. If the operation according to the embodiments of the present invention can be performed, the functional category and the name of the functional unit may be any one.

The transmitter 110 generates a signal to be transmitted to the terminal 20 side and has a function to transmit the signal wirelessly. The transmitter 110 transmits a message between network nodes to the other network nodes. The receiver 120 includes a function for wirelessly receiving various signals transmitted from the terminal 20 and acquiring, for example, information of a higher layer from the received signals. The transmitter 110 has a function to transmit NR-PSS, NR-SSS, NR-PBCH, DL/UL control signals, reference signals, and the like to the terminal 20. The receiver 120 receives a message between network nodes from other network nodes. The transmitter 110 and the receiver 120 may be combined as a communication unit.

The setter 130 stores the preset setting information and various setting information to be transmitted to the terminal 20 in the storage device and reads the preset setting information from the storage device if necessary. The contents of the setting information are, for example, system information.

As described in the exemplary embodiment, the controller 140 performs control pertaining to the broadcasting of system information. The controller 140 performs control of random access. A function unit related to signal transmission in the controller 140 may be included in the transmitter 110, and a function unit related to signal reception in the controller 140 may be included in the receiver 120.

<Terminal 20>

Figure 11:
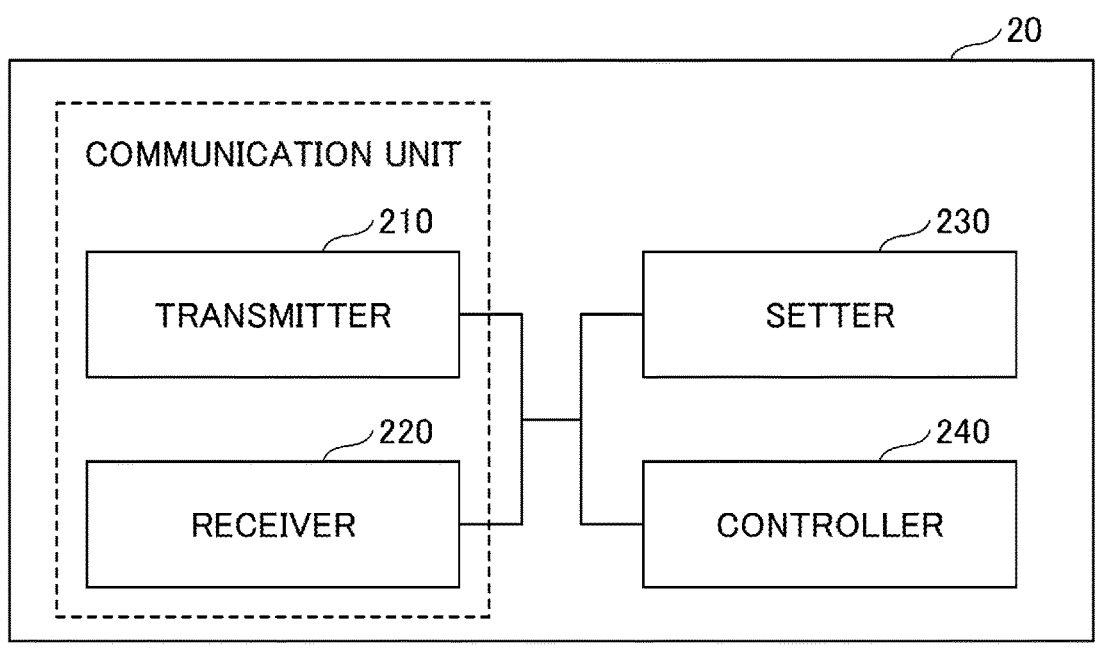
FIG. 11 is a diagram illustrating an example of a functional configuration of a terminal 20 according to an embodiment of the present invention.

FIG. 11 is a diagram illustrating an example of a functional configuration of a terminal 20 according to an embodiment of the present invention. As illustrated in FIG. 11, the terminal 20 includes a transmitter 210, a receiver 220, a setter 230, and a controller 240. The functional configuration illustrated in FIG. 11 is only one example. If the operation according to the embodiments of the present invention can be performed, the functional category and the name of the functional unit may be any one.

The transmitter 210 has a function to create a transmission signal from the transmission data and transmit the transmission signal wirelessly. The receiver 220 receives various signals wirelessly and acquires signals from higher layers from the received signals of the physical layer. The receiver 220 has a function to receive NR-PSS, NR-SSS, NR-PBCH, DL/UL/SL control signals or the like transmitted from the base station 10. For example, the transmitter 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to the other terminal 20 as D2D communication, and the receiver 220 receives PSCCH, PSSCH, PSDCH, PSBCH, and the like from the other terminal 20. The transmitter 210 and the receiver 220 may be combined as a communication unit.

The setter 230 stores various setting information received from the base station 10 or the terminal 20 by the receiver 220 in the storage device and reads it from the storage device as necessary. The setter 230 also stores the preset setting information. The contents of the setting information are, for example, system information.

As described in the exemplary embodiment, the controller 240 performs control pertaining to acquiring system information. The controller 240 performs control of random access. A function unit related to signal transmission in the controller 240 may be included in the transmitter 210, and a function unit related to signal reception in the controller 240 may be included in the receiver 220.

(Hardware Configuration)

Block diagrams (FIGS. 10 and 11) used in the description of the above embodiments show blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (e.g., using wired, wireless, etc.) and implemented using these multiple devices. The functional block may be implemented by combining software with the device or devices.

Functions include, but are not limited to, judgment, determination, determination, calculation, calculation, processing, derivation, research, search, verification, reception, transmission, output, access, resolution, selection, selection, establishment, comparison, assumption, expectation, and deeming; broadcasting, notifying, communicating, forwarding, configuring, reconfiguring, allocating, mapping, and assigning. For example, a functional block (component) that functions to transmit is called a transmitting unit or a transmitter. In either case, as described above, the realization method is not particularly limited.

Figure 12:
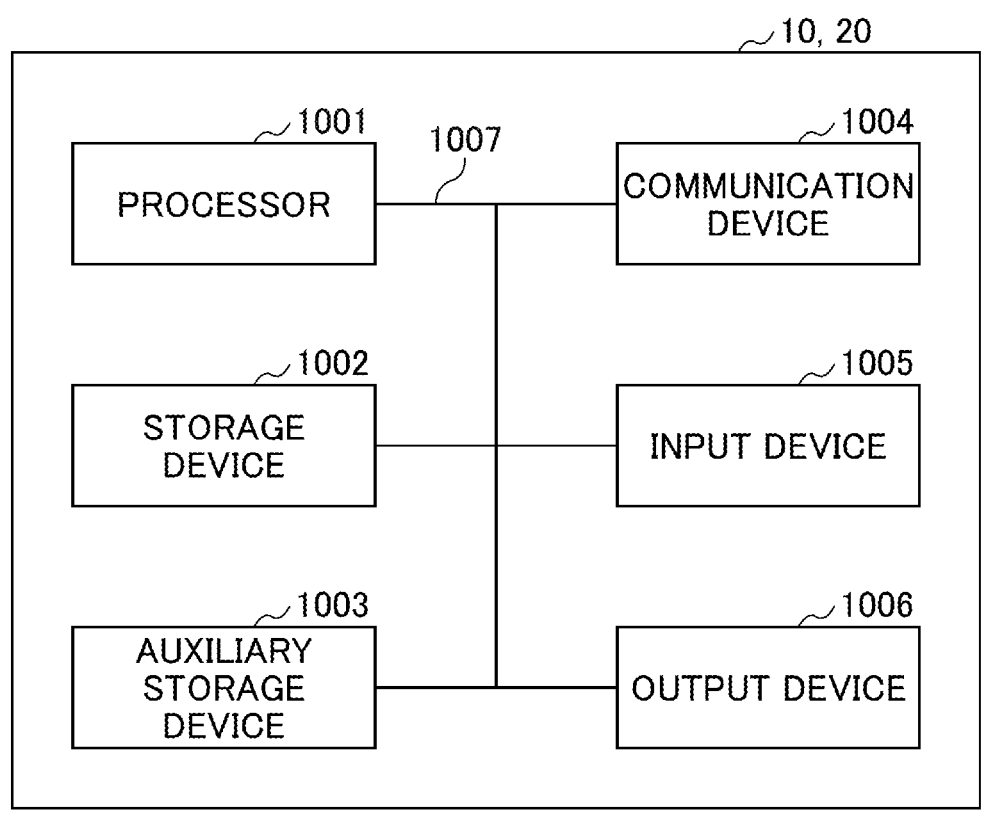
FIG. 12 is a diagram illustrating an example of the hardware configuration of the base station 10 or the terminal 20 according to an embodiment of the present invention.

For example, the base station 10, terminal 20, etc., according to an embodiment of the present disclosure may function as a computer for processing the radio communication method of the present disclosure. FIG. 12 is a diagram illustrating an example of the hardware configuration of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuits, devices, units, etc. The hardware configuration of the base station 10 and the terminal 20 may be configured to include one or more of the devices illustrated in the figure or may be configured without some of the devices.

The functions in the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

A processor 1001 operates, for example, an operating system to control the entire computer. The processor 1001 may be comprised of a central processing unit (CPU) including an interface with peripheral devices, a controller, an arithmetic unit, a register, and the like. For example, the above-described controller 140, controller 240, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of the operation described in the above-described embodiment is used. For example, the controller 140 of the base station 10 illustrated in FIG. 10 may be stored in the storage device 1002 and implemented by a control program operating in the processor 1001. For example, the controller 240 of the terminal 20 illustrated in FIG. 11 may be stored in the storage device 1002 and implemented by a control program operating in the processor 1001. Although the foregoing processes have been described and executed by one processor 1001, they may be executed simultaneously or sequentially by two or more processors 1001. Processor 1001 may be implemented by one or more chips. The program may be transmitted from the network via a telecommunication line.

The storage device 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (main memory), or the like. The storage device 1002 can store programs (program codes), software modules, etc., executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a key drive), a floppy disk, a magnetic strip, and the like. The recording medium described above may be, for example, a database, a server, or other suitable medium that includes at least one of a storage device 1002 and an auxiliary storage device 1003.

The communication device 1004 is a hardware (transmitting/receiving device) for performing communication between computers via at least one of a wired network and a wireless network, and is also referred to as a network device, a network controller, a network card, a communication module, or the like. Communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transceiver unit, the transmission line interface, and the like may be implemented by the communication device 1004. Transmitters and receptacles may be physically or logically isolated implementations of the transmitters and receivers.

Input device 1005 is an input device (e.g., a keyboard, mouse, microphone, switch, button, sensor, etc.) that accepts external input. Output device 1006 is an output device (e.g., a display, speaker, LED lamp, etc.) that implements an external output. The input device 1005 and the output device 1006 may have an integral configuration (for example, a touch panel).

Each device, such as a processor 1001 and a storage device 1002, is connected by a bus 1007 for communicating information. Bus 1007 may be constructed using a single bus or may be constructed using different buses between devices.

The base station 10 and the terminal 20 may also include hardware such as a microprocessor, a digital signal processor (DSP), an ASIC (Application Specific Integrated Circuit), a PLD (Programmable Logic Device), an FPGA (Field Programmable Gate Array), and some or all of the functional blocks may be realized by the hardware. For example, processor 1001 may be implemented using at least one of these hardware.

Summary of Embodiments

As described above, according to an embodiment of the present invention, there is provided a terminal that includes
a receiver configured to receive first system information from a base station; and
a controller configured to acquire a first list, a second list, and a third list for scheduling second system information other than the first system information from the first system information, and to determine a start position of a window for acquiring the second system information, based on the first list, the second list, and the third list, wherein the receiver receives the second system information from the base station in the window.

With the above configuration, the terminal 20 can reliably obtain the scheduled system information when the system information is extended. That is, extended system information can be scheduled.

The second list may schedule extended system information and need not schedule system information scheduled by the first list, and the third list may schedule system information related to position information. The configuration ensures that the terminal 20 obtains the scheduled system information when the new system information, including position information, is extended.

The controller may determine the starting position of the window for acquiring the second system information, based on the position of the second system information in a list in which the first list, the second list and the third list are concatenated in this order. The configuration ensures that the terminal 20 obtains the scheduled system information when the new system information, including position information, is extended.

The controller may determine the start position of the window for acquiring the second system information, based on the position of the second system information in a list in which the first list, the third list, and the second list are concatenated in this order. The configuration ensures that the terminal 20 obtains the scheduled system information when the new system information, including position information, is extended.

In addition, according to an embodiment of the present invention, there is provided a communication method that includes causing a terminal to perform
receiving of first system information from a base station;
acquiring of a first list, a second list, and a third list for scheduling second system information other than the first system information from the first system information, and determining of a start position of a window for acquiring the second system information, based on the first list, the second list, and the third list; and
receiving of the second system information from the base station in the window.

With the above configuration, the terminal 20 can reliably obtain the scheduled system information when the system information is extended. That is, extended system information can be scheduled.

Supplement to Embodiments

Thus, although embodiments of the present invention have been described, the disclosed invention is not limited to such embodiments, and various modifications, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the base station 10 and the terminal 20 have been described using a functional block diagram, but such devices may be implemented in hardware, software, or a combination thereof. Software operated by a processor of the base station 10 in accordance with embodiments of the present invention and software operated by a processor of the terminal 20 in accordance with embodiments of the present invention may be stored in random access memory (RAM), flash memory, read only memory (ROM), EPROM, EEPROM, register, hard disk (HDD), removable disk, CD-ROM, database, server, or any other suitable storage medium.

Notification of information may also be performed in other ways, as well as in the manner/embodiments described in this disclosure. For example, notification of information may be implemented by physical layer signaling (e.g., DCI (Downlink Control Information), UCI (Uplink Control Information), upper layer signaling (e.g., RRC (Radio Resource Control) signaling, MAC (Medium Access Control) signaling), broadcast information (MIB (Master Information Block), SIB (System Information Block)), other signals, or a combination thereof. The RRC signaling may also be referred to as an RRC message, for example, RRC Connection Setup (RRC Connection Setup) message, RRC Connection Reconstruction (RRC Connection Reconstruction) message, or the like.

Each aspect/embodiment described in this disclosure is as follows: LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000 UMB (Ultra Mobile Broadband), IEEE 802.11 (Wi-Fi), IEEE 802.16 (WiMAX), IEEE 802.20, UWB (Ultra-WideBand), Bluetooth (Registered), It may be applied to at least one of the systems utilizing other appropriate systems and the next generation systems extended thereon. Multiple systems may also be applied in combination (e.g., at least one of LTE and LTE-A combined with 5G, etc.).

The processing procedures, sequences, flowcharts, etc. of each aspect/embodiment described herein may be reordered unless there is any conflict. For example, the methods described in the present disclosure are presented using exemplary sequences to present elements of the various steps and are not limited to the particular order presented.

The specific operations described herein as performed by the base station 10 may be performed by its upper node in some cases. In a network of one or more network nodes having a base station 10, it will be apparent that various operations performed for communication with terminal 20 may be performed by at least one of the base station 10 and other network nodes other than base station 10 (e.g., but not limited to MME, S-GW, etc.). Although the above illustrates that there is only one other network node other than the base station 10, the other network nodes may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Software should be broadly interpreted to mean, whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted and received via a transmission medium. For example, when software is transmitted from a website, server, or other remote source using at least one of wireline technology (such as coaxial cable, fiber optic cable, twisted pair, digital subscriber line (DSL)) and wireless technology (infrared, microwave, etc.), at least one of these wireline technology and wireless technology is included within the definition of a transmission medium.

The information, signals and the like described in this disclosure may be represented using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier (CC) may also be referred to as a carrier frequency, cell, frequency carrier, or the like.

As used in this disclosure, the terms "system" and "network" are used interchangeably.

The information, parameters, and the like described in the present disclosure may also be expressed using absolute values, relative values from predetermined values, or they may be expressed using corresponding separate information. For example, the wireless resources may be those indicated by an index.

The name used for the parameters described above is not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, terms such as "base station (BS)", "radio base station", "base station device", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. The base station may also be referred to as a macrocell, a small cell, a femtocell, a picocell, or the like.

The base station can accommodate one or more (e.g., three) cells. If the base station accommodates a plurality of cells, the entire coverage area of the base station can be divided into a plurality of smaller areas, each of which can also provide communications services via a base station subsystem (e.g., a small indoor base station (RRH) or Remote Radio Head). The term "cell" or "sector" refers to part or all of the coverage area of at least one of the base station and the base station subsystem that provides communications services at the coverage.

In this disclosure, terms such as "mobile station (MS)", "user terminal", "user equipment (UE)", "terminal", and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base stations and the mobile station may be referred to as a transmitter, receiver, communication device, or the like. At least one of the base station and the mobile station may be a device mounted on the mobile body, a mobile body, or the like. The mobile may be a vehicle (e.g., a car, an airplane, etc.), an unmanned mobile (e.g., a drone, an automated vehicle, etc.), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read by the user terminal. For example, various aspects/embodiments of the present disclosure may be applied for a configuration in which communication between base stations and user terminals is replaced by communication between multiple terminals 20 (e.g., may be referred to as D2D (Device-to-Device), V2X (Vehicle-to-Everything), etc.). In this case, the terminal 20 may have the functions provided by the base station 10 described above. The phrases "upstream" and "downstream" may also be replaced by the phrases corresponding to terminal-to-terminal communication (e.g., "side"). For example, an upstream channel, an downstream channel, or the like may be read by a side channel.

Similarly, the user terminal in the present disclosure may be read by the base station. In this case, the base station may have the functions provided by the user terminal described above.

As used in this disclosure, the terms "determining" and "determining" may encompass a wide variety of operations. "Judgment" includes, for example, judging, calculating, computing, processing, deriving, investigating, looking up, searching, inquiring (e.g., searching in tables, databases, or other data structures), ascertaining, and so forth. "Judgment" and "decision" may also include receiving (e.g., receiving information), transmitting (e.g., sending information), input, output, and accessing (e.g., accessing data in memory) as "judged" and "determined", and the like. "Judgment" and "decision" may also include "judgment" and "decision" regarding matters such as resolving, selecting, choosing, establishing, comparing, etc. That is, the "judgment" and the "decision" may include deeming some action to be "judgment" and "determination". "Decision" may be read as "Assuming", "Expecting", or "Considering", etc.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on solely" unless otherwise specified. In other words, the expression "based on" means both "based on solely" and "based on at least".

Any reference to an element using a designation such as "first" or "second" as used in the present disclosure does not generally limit the amount or order of those elements. These designations can be used in the present disclosure as a convenient way to distinguish between two or more elements. Thus, references to the first and second elements do not imply that only two elements may be employed or that the first element must in some way precede the second element.

"Means" in the configuration of each of the above devices may be replaced by "parts", "circuits", "devices", etc.

When the terms "include", "including" and variations thereof are used in the present disclosure, these terms are intended to be comprehensive as well as the term "comprising". Moreover, the term "or" as used in this disclosure is not intended to be an exclusive-OR.

The radio frame may consist of one or more frames in the time domain. Each frame or frames in the time domain may be referred to as subframes. The subframe may further comprise one or more slots in the time domain. The subframe may be a fixed length of time (e.g., 1 ms) independent of the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, certain filtering processing performed by the transceiver in the frequency domain, and specific windowing processing performed by the transceiver in the time domain.

The slot may consist of one or more symbols in the time domain, such as OFDM (Orthogonal Frequency Division Multiplexing) symbols, SC-FDMA (Single Carrier Frequency Division Multiple Access symbols, and the like. The slot may be in time units based on a numerology.

The slots may include a plurality of minislots. Each minislot may be comprised of one or more symbols in the time domain. The minislot may also be referred to as a subslot. The minislots may consist of fewer symbols than the slots. A PDSCH (or PUSCH) transmitted in time units greater than a minislot may be called a PDSCH (or PUSCH) mapping type A. PDSCH (or PUSCH) transmitted using minislots may be referred to as PDSCH (or PUSCH) mapping type B.

Radio frames, subframes, slots, minislots and symbols all represent time units for transmitting signals. Radio frames, subframes, slots, minislots and symbols, respectively, may be designated separately.

For example, one subframe may be referred to as a Transmission Time Interval (TTI), multiple consecutive subframes may be referred to as a TTI, and one slot or one minislot may be referred to as a TTI. That is, at least one of the subframes and the TTI may be a subframe (1 ms) in the conventional LTE, a period shorter than 1 ms (e.g., 1-13 symbols), or a period longer than 1 ms. The unit representing the TTI may be referred to as a slot, a minislot, or the like, rather than a subframe.

The TTI refers, for example, to the minimum time unit for scheduling in wireless communication. For example, in an LTE system, a base station schedules each terminal 20 to allocate wireless resources (such as frequency bandwidth, transmit power, etc. that can be used in each terminal 20) in TTI units. The definition of TTI is not limited to this.

The TTI may be a transmission time unit, such as a channel-encoded data packet (transport block), code block, codeword, or the like, or may be a processing unit, such as a scheduling or link adaptation. When a TTI is provided, the time interval (e.g., the number of symbols) during which the transport block, code block, codeword, or the like is actually mapped may be shorter than the TTI.

If one slot or one minislot is referred to as a TTI, one or more TTIs (i.e., one or more slots or one or more minislots)

may be the minimum time unit for scheduling. The number of slots (minislots) constituting the minimum time unit of the scheduling may also be controlled.

A TTI having a time length of 1 ms may be referred to as a TTI (usually a TTI in LTE Rel. 8-12), a normal TTI, a long TTI, a normal subframe, a normal subframe, a long subframe, a slot, and the like. A TTI that is typically shorter than a TTI may be referred to as a shortened TTI, a short TTI, a partial TTI (partial or fractional TTI), a shortened subframe, a short subframe, a minislot, a subslot, a slot, or the like.

The long TTI (e.g., usually TTI, subframe, etc.) may be interpreted as a TTI having a time length exceeding 1 ms, and the short TTI (e.g., shortened TTI, etc.) may be interpreted as a TTI having a TTI length less than the TTI length of the long TTI and a TTI length greater than 1 ms.

Resource blocks (RBs) are time domain and frequency domain resource allocation units and may include one or more consecutive subcarriers in the frequency domain. The number of subcarriers included in the RB may be the same, regardless of the numerology, for example 12. The number of subcarriers included in the RB may be determined on the basis of numerology.

The time domain of the RB may also include one or more symbols, which may be 1 slot, 1 minislot, 1 subframe, or 1 TTI in length. One TTI, one subframe, etc., may each consist of one or more resource blocks.

Note that one or more RBs may be referred to as physical resource blocks (PRBs), sub-carrier groups (SCGs), resource element groups (REGs), PRB pairs, RB pairs, and the like.

Resource blocks may also consist of one or more resource elements (RE). For example, 1 RE may be a wireless resource area of one sub-carrier and one symbol.

The bandwidth portion (which may also be referred to as a partial bandwidth, etc.) may represent a subset of consecutive common RB (common resource blocks) for a given numerology in a carrier. Here, the common RB may be identified by an index of RB relative to the common reference point of the carrier. A PRB is defined in a BWP and may be numbered within that BWP.

BWP may include BWP for UL (UL BWP) and BWP for DL (DL BWP). For a UE, one or more BWPs may be configured in one carrier.

At least one of the configured BWPs may be active, and the UE need not assume that it will send and receive predetermined signals/channels outside of the active BWP. The terms "cell" and "carrier" in this disclosure may be replaced by "BWP".

Structures such as radio frames, subframes, slots, minislots, and symbols described above are exemplary only. For example, the number of subframes included in a radio frame, the number of slots per subframe or radio frame, the number of minislots included in the slot, the number of symbols and RBs included in the slot or minislot, the number of subcarriers included in the RB, the number of symbols in the TTI, the symbol length, the length of the cyclic prefix (CP) length, and the like may vary.

In the present disclosure, where an article is added by translation, for example a, an, and the English language, the disclosure may include that the noun following these articles is plural.

In this disclosure, the term "A and B are different" may mean "A and B are different from each other". Note that the term may mean "A and B are different from C". Terms such as "separated" or "combined" may also be interpreted as "different".

The aspects/embodiments described in this disclosure may be used alone, in combination, or switched with implementation. Notification of given information (e.g. notification of "X") may be performed not only explicitly but also implicitly (e.g. "no notification of the given information") y.

In the present disclosure, SIB1 is an example of the first system information. The SI message to be acquired is an example of the second system information. "SchedulingInfoList" is an example of the first list. "schedulingInfoList-v15xy" is an example of a second list. "pos-schedulingInfoList" is an example of a third list.

While the present disclosure has been described in detail above, those skilled in the art will appreciate that the present disclosure is not limited to the embodiments described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

This international patent application claims priority to Japanese Patent Application No. 2020-137665, filed Aug. 17, 2020, the entire contents of which are hereby incorporated by reference.

DESCRIPTION OF THE REFERENCE NUMERALS 10 base station
110 transmitter
120 receiver
130 setter
140 controller
20 terminal
210 transmitter
220 receiver
230 setter
240 controller
30 core network
1001 processor
1002 storage device
1003 auxiliary storage device
1004 communication device
1005 input device
1006 output device

The invention claimed is:
1. A terminal comprising:
a receiver configured to receive first system information from a base station; and
a controller configured to acquire, from the first system information, a first list, a second list, and a third list for scheduling second system information other than the first system information, and to determine a start position of a window for acquiring the second system information, based on a position of scheduling information of the second system information in a list, wherein the first list, the second list, and the third list are concatenated in this order in the list,
wherein the receiver receives the second system information from the base station in the window,
the second list schedules extended system information and does not schedule system information scheduled by the first list, and
the third list schedules system information related to position information.

2. A communication method comprising:
causing a terminal to perform
receiving of first system information from a base station;
acquiring of, from the first system information, a first list, a second list, and a third list for scheduling second system information other than the first system information, and determining of a start position of a window for acquiring the second system information, based on a position of scheduling information of the second system information in a list, wherein the first list, the second list, and the third list are concatenated in this order in the list;
receiving of the second system information from the base station in the window,
the second list schedules extended system information and does not schedule system information scheduled by the first list, and
the third list schedules system information related to position information.

3. A base station comprising:
a controller configured to schedule second system information other than first system information, and to include, in first system information, a first list, a second list, and a third list for indicating a start position of a window for acquiring the second system information by a terminal based on a position of scheduling information of the second system information in a list, wherein the first list, the second list, and the third list are concatenated in this order in the list; and
a transmitter configured to transmit the first system information to the terminal,
wherein the transmitter transmits the second system information to the terminal,
the second list schedules extended system information and does not schedule system information scheduled by the first list, and
the third list schedules system information related to position information.

4. A wireless communication system comprising: a base station; and a terminal, wherein
the base station includes:
a controller configured to schedule second system information other than first system information, and to include, in first system information, a first list, a second list, and a third list for indicating a start position of a window for acquiring the second system information by a terminal; and
a transmitter configured to transmit the first system information to the terminal,
wherein the transmitter transmits the second system information to the terminal, and the terminal includes:
a receiver configured to receive the first system information from the base station; and
a controller configured to acquire, from the first system information, a first list, a second list, and a third list, and to determine a start position of a window for acquiring the second system information, based on a position of scheduling information of the second system information in a list, wherein the first list, the second list, and the third list are concatenated in this order in the list,
wherein the receiver receives the second system information from the base station in the window,
the second list schedules extended system information and does not schedule system information scheduled by the first list, and
the third list schedules system information related to position information.

* * * * *